(12) United States Patent
Piikivi et al.

(10) Patent No.: US 7,050,993 B1
(45) Date of Patent: May 23, 2006

(54) ADVANCED SERVICE REDIRECTOR FOR PERSONAL COMPUTER

(75) Inventors: Lauri Piikivi, Oulu (FI); Markku Heiskala, Oulu (FI)

(73) Assignee: Nokia Corporation, Espoo (FI)

( * ) Notice: Subject to any disclaimer, the term of this patent is extended or adjusted under 35 U.S.C. 154(b) by 707 days.

(21) Appl. No.: 09/559,499

(22) Filed: Apr. 27, 2000

(51) Int. Cl.
*G06F 17/60* (2006.01)

(52) U.S. Cl. .................................... 705/26; 713/182
(58) Field of Classification Search ............. 705/25, 705/26, 27, 35, 44; 713/182, 168; 704/270; 455/41, 406; 709/204
See application file for complete search history.

(56) References Cited

U.S. PATENT DOCUMENTS

| | | | |
|---|---|---|---|
| 6,098,053 A * | 8/2000 | Slater | 705/44 |
| 6,175,922 B1 * | 1/2001 | Wang | 713/182 |
| 6,185,682 B1 * | 2/2001 | Tang | 713/168 |
| 6,219,694 B1 * | 4/2001 | Lazaridis et al. | 709/206 |
| 6,256,664 B1 * | 7/2001 | Donoho et al. | 709/204 |
| 6,269,336 B1 * | 7/2001 | Ladd et al. | 704/270 |
| 6,442,532 B1 * | 8/2002 | Kawan | 705/35 |
| 6,473,609 B1 * | 10/2002 | Schwartz et al. | 455/406 |
| 2002/0022453 A1 * | 2/2002 | Balog et al. | 455/41 |

FOREIGN PATENT DOCUMENTS

WO    WO 99/27742    *    6/1999

OTHER PUBLICATIONS

Press release, "Bluetooth Technology Set To Re-Define The Personal Communication Market", Phillips Business Information Communications Standards News; Potomac; Dec. 20, 1999, 2 pages, extracted from Internet from http://proquest.umi.com on Feb. 25, 2003.*

McLucas, Kate; "Accessorize the brand-new you," InfoWorld; Framingham; Aug. 23, 1999 extracted from Internet from http://proquest.umi.com on Feb. 25, 2003.*

* cited by examiner

*Primary Examiner*—Y. C. Garg
(74) *Attorney, Agent, or Firm*—Harrington & Smith,LLP

(57) ABSTRACT

A system and a method is shown for conducting electronic commerce. The system includes a mobile station (10) containing a user interface (15) and an application (27A), which could cooperate with a user authentication module (13A); and a computer (1) coupled to a data communications network (2). The computer includes a browser (1A) for contacting a site, such as a commerce related site, and a browser plug-in module (1B) and/or a browser extension. The browser and plug-in (or extension) cooperate to detect a presence of a received message that requires a response from the user, such as an authentication of the user, or a digital signature, or a payment request, etc. The computer also includes an interface (1C, 1D, 1E) for sending a message from the computer to the mobile station over a bidirectional link (3). The mobile station application is responsive to the receipt of the message from the computer for generating a user response message and for passing the generated user response message to the computer over the link. The computer is responsive to a receipt of the user response message for sending user response information to the site using the browser. The mobile station, or the computer, operates to prompt the user to enter a personal identification number, and the entered PIN is compared to a PIN stored in the mobile station. The link may be implemented using Bluetooth technology.

9 Claims, 2 Drawing Sheets

ADVANCED SERVICE REDIRECTOR FOR PERSONAL COMPUTER

FIELD OF THE INVENTION

This invention relates generally to electronic commerce (e-commerce) and, more particularly, to methods and apparatus for conducting e-commerce using, at least in part, the facilities of a wireless telecommunications device, such as a cellular telephone.

BACKGROUND OF THE INVENTION

As wireless communications devices and methods have evolved it has become possible to employ the wireless telecommunications device, such as a cellular telephone or mobile station, in order to conduct e-commerce.

For example, in one evolving standard known as "Bluetooth", the specification for which can be found at (http://www.bluetooth.com), a user is enabled to electronically pay for parking meters, bus tickets, shopping, movies and the like through the use of a short range (e.g., about 10 meters) wireless link (at 2.45 GHz) between the user's mobile station and a suitably equipped point of sale (POS) terminal, vending machine, etc. Data transmission speeds of between about 720 kbps and about 1000 kbps are expected to be feasible. In accordance with the Bluetooth standard each device is assigned a unique 12 byte address. In order to connect to the device the 12 byte address must be known.

The Wireless Applications Protocol (WAP) is another evolutionary step in the wireless telecommunications device area. The WAP specification can be found at (http://www.WAPforum.org. Basically, WAP takes a client server approach and incorporates a relatively simple "microbrowser" into the mobile station. The microbrowser is intended to require only limited resources of the mobile station, as the system intelligence is instead placed in external WAP gateways, thereby reducing the processing burden on the mobile station. WAP provides a user authentication service.

A WAP Identity Module (WIM) is an application stored in a tamper resistant device, such as a smartcard or a security Application Specific Integrated Circuit (ASIC), that provides public key infrastructure (PKI) based client authentication and digital signature services. The client authentication and digital signature services are based on private keys and digital certificates that are under the control of the WIM application. The WIM can be embedded within a SIM card or module, or ir could be plugged into the mobile station separately.

In a presentation entitled "WAP Terminal as an E-commerce device", IBC Mobile Commerce-99 Conference "Internet Bank Security", Juhani Miettunen proposed a WAP-enabled mobile station for use in mobile banking and other services. The mobile station is proposed for use in funds transfers between a user's accounts, for portfolio management, for bill payment and presenting, and for debit payments, credit payments, electronic purse and micropayments. The mobile station could include a "bank chip", or a credit card chip, or some other type of plug-in or embedded device that enables the mobile station to be used for trusted financial and other applications, with secure user authentication.

It is known in the art to provide a Secure Electronic Transaction (SET) system for ensuring the security of financial transactions on the Internet. With SET, a user is given an "electronic wallet" (digital certificate), and a transaction is conducted and verified using a combination of digital certificates and digital signatures among the purchaser, a merchant, and the purchaser's bank. SET can make use of the Secure Sockets Layer (SSL), Secure Transaction Technology (STT), and Secure Hypertext Transfer Protocol (S-HTTP). SET uses some, but not all, of the public key infrastructure (PKI).

In the SET system a customer opens a bank account, typically through a credit card issuer, and receives a digital certificate. The digital certificate is an electronic file that functions as a credit card for online purchases and other transactions. It includes a public key with an expiration date, and is digitally signed by the bank to ensure its validity. Third party merchants also receive certificates from the bank. These certificates include the merchant's public encryption key and the bank's public encryption key. When the customer places an order over the Internet the customer's browser receives and confirms from the merchant's certificate that the merchant is valid. The browser then sends a message to the merchant with the order information. This message is encrypted with the merchant's public key, with payment information, which is encrypted with the bank's public key (and can't be read by the merchant), and information that ensures that the payment can only be used with this particular order. The merchant then verifies the customer by checking the digital signature on the customer's certificate. This may be done by referring the customer's certificate to the bank or to a third party verifier. The merchant then sends the order message along to the bank. This includes the bank's public key, the customer's payment information (which the merchant is incapable of decoding), and the merchant's certificate. The bank then verifies the merchant and the message using the digital signature on the certificate with the message. The bank also verifies the payment part of the message, then digitally signs and sends the authorization to the merchant, who can then fill the order.

OBJECTS AND ADVANTAGES OF THE INVENTION

It is a first object and advantage of this invention to provide an improved electronic commerce method using a mobile station, such as a cellular telephone or a personal communicator.

It is another object and advantage of this invention to provide an improved electronic commerce method whereby an Internet browser employs a software module or plug-in that re-directs certain commerce-related messages to a mobile station, which in turn participates in validating and authenticating the identity of the user, and thus aids in consummating the electronic commerce transaction.

SUMMARY OF THE INVENTION

The foregoing and other problems are overcome and the objects of the invention are realized by methods and apparatus in accordance with embodiments of this invention.

The inventors have recognized that Internet connectivity using service providers or company networks often relies on certain PC-executed applications or command scripts which create the connection, and which also authenticate the user. In accordance with the teachings herein, the authentication of the user is carried out instead by the mobile station based on, for example, a personal identification number (PIN) and on security services provided by, for example, the WAP (in particular, digital signatures). The challenge from the Internet service provider or the company network is received by a browser, and is recognized and passed to a plug-in software module. From the plug-in software module the challenge is forwarded to a user authentication module in the mobile station via a PC-based utilization application, transaction protocol and communication module(s). The connection between the PC and the mobile station can be a short range wireless connection based on the Bluetooth standard, or on any suitable bidirectional data transmission technique.

In response to receiving the challenge, the mobile station operates to create a digital signature, after user authentication, using the PIN. A user interface of the mobile station can be employed to prompt the user to enter the PIN, which is checked against a stored PIN. If the two match, then the authentication process is completed in a normal fashion. However, in this case the resulting authentication cryptogram generated by the mobile station is forwarded back to the PC, via the Bluetooth link, and from the PC to the originator of the challenge, who is then enabled to verify then validity of the challenge and the identify of the user. Having verified the identity of the user, the user may be enabled to make an on-line purchase of goods or services, order tickets, etc.

The teachings of this invention are compatible with WAP technology, as well as with the above-described Secure Electronic Transaction (SET) technology, as well as with Europay-Mastercard-Visa (EMV) technology, as well as with the above-mentioned WIM technology.

Disclosed herein is a system and a method suitable for conducting electronic commerce. The system includes a mobile station containing a user interface and at least one utilization application, which could cooperate with a user authentication module. A computer, such as a PC, is coupled to a data communications network. The computer includes a browser for contacting a site, such as a commerce related site, and a browser plug-in module and/or a browser extension. The browser and plug-in (or extension) cooperate to detect a presence of a received message that requires a response from the user, such as an authentication of the user, or a digital signature, or a payment request, etc. The computer also includes an interface for sending a message from the computer to the mobile station over a bidirectional link. The mobile station application is responsive to the receipt of the message from the computer for generating a user response message and for passing the generated user response message to the computer over the link. The computer is responsive to a receipt of the user response message for sending user response information to the site using the browser. The mobile station, or the computer, operates to prompt the user to enter a personal identification number, and the entered PIN is compared to a PIN stored in the mobile station. The link may be implemented using Bluetooth technology.

The teachings of this invention go beyond only authenticating the user. For example, in the EMV environment a mobile station application, together with a peer application in the computer and optional transaction protocol(s) in the mobile station and the computer, can create a flow of operations for completing a financial transaction with a commerce related site.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
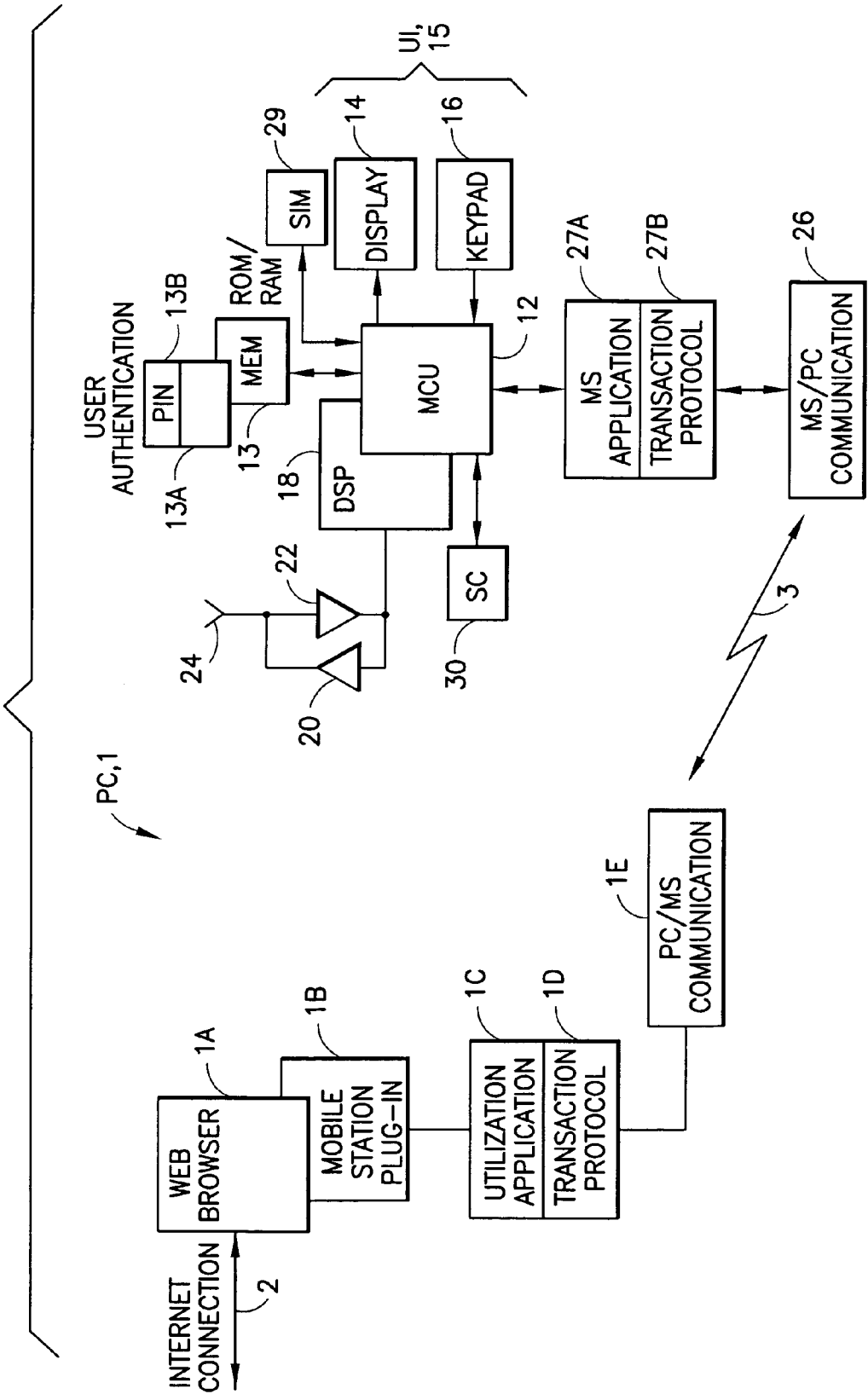
FIG. 1 is block diagram of a mobile station and an Internet-connected personal computer (PC), wherein the PC and the mobile station are bidirectionally coupled together for implementing the teachings of this invention.

Referring to FIG. 1, there is illustrated a simplified block diagram of an embodiment of a mobile station 10 coupled to a computer, such as a personal computer 1 having a connection to the Internet 2.

The mobile station 10 typically includes a microcontrol unit (MCU) 12 having an output coupled to an input of a display 14 and an input coupled to an output of a keyboard or keypad 16. The display 14 and keypad 16 may be considered to form a user interface (UI) 15 of the mobile station 10.

The mobile station 10 can be a handheld radiotelephone, such as a cellular telephone or a personal communicator. The mobile station 10 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 12 is assumed to include or be coupled to some type of a memory 13, including a read-only memory (ROM) for storing an operating program, as well as a random access memory (RAM) for temporarily storing required data, scratchpad memory, received messages, and the like. A separate, removable SIM 29 can be provided as well, the SIM 29 storing, for example, a preferred Public Land Mobile Network (PLMN) list and other subscriber-related information. The ROM is assumed, for the purposes of this invention, to store a program enabling the MCU 12 to execute the software routines required to operate with e-commerce related software in the PC 1, as discussed below.

Although not particularly germane to an understanding of this invention, the mobile station 10 also contains a wireless section that includes a digital signal processor (DSP) 18, or equivalent high speed processor, as well as a wireless transceiver comprised of a transmitter 20 and a receiver 22, both of which are coupled to an antenna 24 for communication with a network operator (not shown).

The PC 1 is assumed to include a number of software modules, including a Web browser 1A, a mobile station plug-in program or module 1B, a mobile station utilization application 1C, an optional transaction protocol module 1D, as well as a hardware and software PC to mobile station (PC/MS) communication module 1E. The mobile station 10 includes a complementary MS/PC communications module 26. A communication link 3 is thus established between the PC 1 and the mobile station 10. The mobile station 10 preferably also include peer modules, including a mobile station (MS) application 27A and transaction protocol 27B. The PC transaction protocol module 1D, as well as the MS transaction protocol 27B, can be optional in the sense that they may not always be necessary for facilitating the communication between the peer applications (1C, 27A) in the PC 1 and the mobile station 10.

In the presently preferred embodiment of this invention the communication modules 1E and 26, and the resulting wireless communication link 3, conform to the Bluetooth standard, although the teachings of this invention are not limited for use with only the Bluetooth standard. For example, a wireless IR link could be used, as could a wired link between the PC 1 and the mobile station 10. In fact, and for the case discussed above where the mobile station 10 is placed within a card installable within the PC, such as a PCMCIA card, the link 3 could conform to the conventional PCMCIA electrical interface. In this latter case it should be further realized that the Internet connection to the PC 1 need not be a wired connection, but could be a wireless connection made through an RF modem of the mobile station 10.

The memory 13 of the mobile station 10 is assumed, for the purposes of this invention, to include one or more programs for generating a payment transaction or authentication cryptogram. The program or programs are generally referred to in FIG. 1 as a user authentication module 13A, and could include or operate with a Personal Identification Number (PIN) 13B that is also stored in the mobile station memory 13 (typically in a non-volatile region). The operation of the user authentication module 13A is triggered by the software in the PC 1, via the link 3, and the result of the authentication process, such as a digital signature, is returned from the mobile station 10 to the PC 1, also via the link 3. In many applications there is cooperation between the user authentication module 13A and the MS application 27A and transaction protocol 27B, wherein the user authentication module 13A is the generator of the cryptogram or digital signature based on a request from the MS application 27A.

It should be noted that the user authentication module 13A need not be a software module stored in the memory 13, but could as well be implemented within a plug-in module, such as the smartcard 30, which could be an EMV or WIM smartcard, or it could be implemented with WIM functionality that is housed in a security ASIC.

In general, actions carried out by the user when Internet browsing and those arising from server connectivity can be identified based on message parsing (e.g., Multi-Purpose Internet Mail Extensions (MIME) field recognition), or by specialized software, such as local or remote connectivity to a company intranet that is carried out by a certain (possibly modified) dial-in or LAN access application.

The Internet Web browser 1A may use plug-in technology for the purpose of identifying certain messages and transactions, which are then passed to the plug-in module 1B for processing. In accordance with an aspect of this invention, the plug-in module 1B redirects certain messages to the mobile station utilization application 1C which then, in accordance with the mobile station transaction protocol 1D, carries out the transaction with the mobile station 10. The mobile station 10 application, specifically the user authentication application 13A, generates a payment transaction or authentication cryptogram which is then passed back to the originator of the message on the Internet.

Note that the plug-in module 1B is not, in all cases, the only technique for achieving the desired result. For example, for authentication and signing purposes in Netscape™ the PKCS#11 interface might be employed, while with Internet Explorer™ the Crypto API may be applicable. As such, it can be appreciated that the plug-in module 1B, or some equivalent browser function or browser extension thereof, can be employed for the purposes herein.

In general, the plug-in or the equivalent browser extension 1B can be a relatively simple component for primarily passing, for example, an authentication challenge or payment request onwards to the utilization application 1C for further processing and decision making. The utilization application 1C has the equivalent peer application 27A in the mobile station 10, and cooperates with same to generate a response to the Internet site.

For different uses there may be specialized applications for each case in the PC 1 and mobile station 10. For example, one PC utilization application 1A/mobile station 10 application 27A pair can be provided for EMV (as well as protocols 1D/27B), and another 1A/27A pair can be provided for authentication and digital signatures, etc.

In general, the overall PC application uses the transaction protocol 1D for carrying out the transaction with the mobile station 10, which is interposed between the Internet browser 1A and the local mobile station connectivity interface (1E), such as a Bluetooth driver for directing messages to and from the mobile station 10. The transaction protocol 1D is one selected for interfacing to the mobile station 10 user authentication module 13A, such as one for interfacing to the WAP user authentication service.

As was indicated above, the PC modules 1C and 1D interface with the peer modules 27A and 27B in the mobile station 10, while the transaction protocol modules 1D and 27B should be viewed as being optional, and are not required in all cases.

The inventors have recognized that Internet connectivity using service providers or company networks often relies on certain application or command scripts which create the connection, and which also authenticate the user. In accordance with an aspect of the teachings herein, the authentication of the user is carried out instead by the mobile station 10 based on, for example, the already provided PIN 13B and on security services provided by, for example, the WAP (in particular, digital signatures). The challenge from the Internet service provider or the company network is received by the browser 1A, and is recognized and passed to the plug-in 1B (or browser extension). From the plug-in 1B the challenge is forwarded to the user authentication module 13A via the utilization application 1C, transaction protocol 1D and the communication modules 1E and 26, as well as the mobile station 10 peer modules 27A and 27B.

In response, the mobile station 10 operates to create the digital signature, after user authentication, such as by using the PIN 13B. That is, the user interface 15 of the mobile station 10 can be employed to prompt the user to enter the PIN, which is then checked against the stored PIN 13B. If the two match, then the authentication process is completed and the resulting authentication cryptogram or digital signature is forwarded back to the PC 1, via the link 3, and from the PC 1 to the originator of the challenge, who is then enabled to verify the validity of the challenge and the identity of the user, which is the desired result. Having verified the identity of the user, the user can be enabled to make an on-line purchase of goods or services, order tickets (which may be downloaded to the mobile station 10), etc.

That is, the mobile station protocol and applications can also be used to modify data in the mobile station 10, such as when loading electronic tickets into the mobile station 10. In this case data representing at least one electronic ticket is downloaded from a site, via the browser 1A, to the memory 13 of the mobile station 10.

This teachings of this invention thus provide for secure financial payments in Internet shopping, when using a payment-capable mobile station 10. In addition, the overall Internet connection is made simpler, as additional hardware tokens for authentication are not required. These teachings thus overcome the problems inherent in prior art security techniques, such as by using PC-based passwords and cryptographic techniques.

Secure payments can thus be provided with a unified interface, as the mobile station 10 may be used for making purchases separately from the PC-based Internet browsing. Authentication is facilitated by the connectivity procedure in accordance with these teachings, as the mobile station 10 is used not only for data transfers, but is used as well for authenticating the identity of the user.

Figure 2:
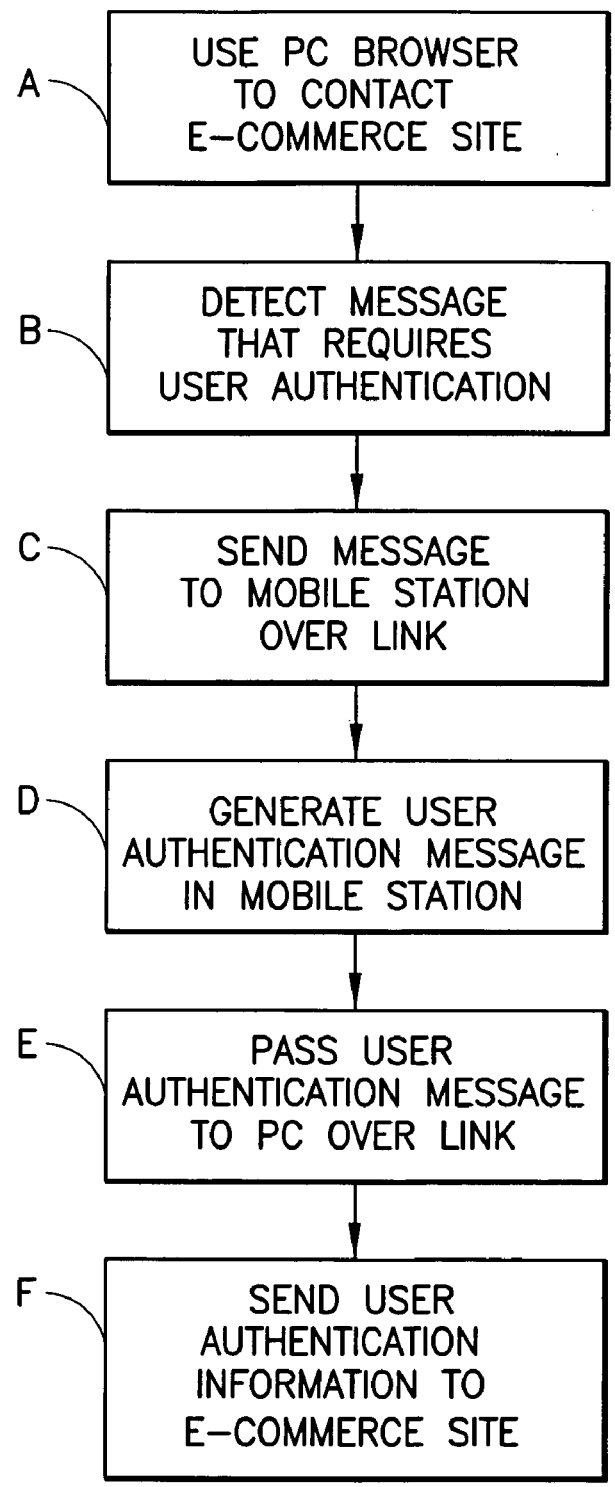
FIG. 2 is a logic flow diagram of a method in accordance with the teachings of this invention.

Referring to FIG. 2, in accordance with an exemplary method of this invention for conducting electronic commerce the following steps are executed. At Step A a computer (e.g., PC 1) is operated to contact a commerce-related site using a browser (1A); and at Step (B) the browser (1A) and, if applicable, the plug-in (1B) cooperate to detect a presence of a received message that requires, as a response, an authentication of a user. At Step C a message is sent from the computer to the mobile station (10) over a link (3); and in response the mobile station generates, at Step D, a user authentication message. At Step E the user authentication message is passed from the mobile station to the computer over the link; and at Step F the authentication message is sent to the commerce-related site using the browser (1A).

The teachings of this invention go beyond authenticating the user. For example, in the EMV environment the mobile station application, together with the transaction protocol in the mobile station, may create a flow of operations for completing the financial transaction with the commerce related site.

It should be noted that the process can be bidirectional between the commerce site and the mobile station 10, and need not necessarily always be the same, at it can depend on decisions made by the commerce site and a EMV smartcard (SC) 30 located in the mobile station 10, and on the communication between them. The mobile station application and the transaction protocol 1D and equivalent components in the PC 1 are responsible for the user interaction and for facilitating the transactions between them.

For the SET case, it may be desirable to store the digital certificate in the mobile station 10, as well as at least a portion of the SET wallet functionality. Basically, the entire SET wallet functionality could be formed as a combination utilization applications 1C, 27A, and the user authentication module 13A, with the latter housing keys and certificates as a software implementation.

One possible flow for a SET payment could be as follows: The user initiates a SET payment in the merchant site. The merchant site sends a "SET-init" message to the PC browser 1A. This message is recognized by the browser 1A based on the MIME fields and redirected to the plug-in component 1B, which transfers it to the SET-specific PC utilization application 1C. The application 1C primarily knows how to maintain the communication between the merchant site and the SET Wallet (MS Application 27A).

It should be noted at this point that the exact division of the functionality between applications 1C and 27A is an implementation specific matter, and it may be feasible to put more functionality into the PC application 1C. For example, during the process the SET-specific PC application 1C may also provide information such as payment details to the user on the PC screen, and in a further case the mobile station screen/keypad, or UI 15, is only used for the PIN input. For security reasons, and for the non-PCMCIA embodiments, it is desirable to enter the PIN into the mobile station 10 so that it is not passed over a possibly insecure link to the PC 1, which may also house hostile applications.

In any event, next the SET Wallet (e.g., 27A) in the mobile station 10 interacts with the merchant site and the user (acceptance and PIN code) and uses the public keys received from the merchant, as well as user digital certificates and private keys stored in the user authentication module 13A (or smartcard 30) in mobile station 10, to create a valid signed and encrypted SET transaction which is then passed to the merchant site through the above-described PC components.

Further examples of the operation and utility of these teachings are now provided.

(A) For the case of client authentication to a web site, the user browses to a www site that is requesting SSL client authentication. The PC browser 1A receives the authentication request. An extension component of the authentication service of the PC browser 1A communicates with a specialized PC application (1C) which requests a list of applicable authentication certificates located in the mobile station 10. These could be located, for example, in a WIM stored in the smartcard 30, a WIM stored in a security ASIC, or the software-based user authentication module 13A, or from all of these locations. The mobile station peer application 27A collects the list of certificates and sends the list back to the PC 1. The user is then presented, in the standard PC browser authentication window, with the list of the possible certificates. After selection by the user, the indication of the selection is sent back to MS application 27A, which communicates with the source of the certificate (e.g., the smartcard 30) and then performs the PIN code request to the user. The MS application 27A then passes the PIN code to the source of the certificate and, after the source has verified the PIN code, it signs the authentication certificate with the corresponding private key and passes the signed certificate to MS application 27A, which in turn passes the certificate to PC utilization application 1C, which in turn further passes the certificate to the standard authentication functionality in the PC browser 1A. The PC browser 1A then completes the authentication process with the www site.

Alternatives to the foregoing can include using a plug-in like technology, and not the standard authentication components in the PC browser 1A, as well as placing more functionality in the MS application 27A so that the certificate list would only be presented on the mobile station display 14. In this case, after the certificate selection and PIN code request the signed certificate would be passed to the PC utilization application 1C.

(B) As a further example of the utility of these teachings, assume a case of an EMV payment to a WAP merchant. In this case the user initiates an EMV credit card payment at the web merchant site. The PC browser 1A receives and recognizes the EMV payment request (based on the MIME fields) and forwards it to an EMV-specific browser plug-in 1B. The browser plug-in 1B launches the specialized EMV and mobile station aware PC application 1C, such as Visa Smart Debit Credit (VSDC), which begins communication with its peer application 27A in the mobile station 10. The peer application 27A takes care of the communication with the EMV smartcard 30 located in the mobile station 10 (based on standard APDU messages), and takes care of interaction with the user through the UI 15 (acceptance, PIN request, other information), and then processes the information further so as to be valid for higher level operations. The processed information is then communicated with the PC EMV application (1C) by using these higher level operations. In the case of an optional transaction protocol the units 1D and 27B may be desirable and useful. Next the PC utilization application 1C communicates with the EMV merchant. There may be several cycles of communication between the EMV merchant, the utilization applications 1C and 27A, and the EMV smartcard 30 before the payment transaction is completed (or rejected).

(C) For the case of a digital signature to a web site (application), assume that the user employs a web application which initiates a digital signature request as a confirmation of a transaction, such as a stock purchase or sale. The PC browser 1A receives the signing request together with the text to be signed, for example, stock purchase details including the terms. A signature extension component of the PC browser 1A communicates with a specialized PC application (1C) which requests a list of applicable signature certificates located in the mobile station 10. As in the previous example, these could be located, for example, in a WIM stored in the smartcard 30, a WIM stored in a security ASIC, or the software-based user authentication module 13A, or in all of these locations. The mobile station peer application 27A collects the list of certificates and sends the list back to the PC 1 (or alternatively uses the UI 15 of the mobile station 10). The user is then presented, such as in the standard PC browser authentication window, with the list of the possible certificates. After selection by the user, the indication of the selection is sent back to MS application 27A, which communicates with the source of the certificate (e.g., the smartcard 30) and then performs the PIN code request to the user. The entered PIN code is passed to the source of the certificate and, after the source has verified the PIN code, it signs the authentication certificate with the corresponding private key and passes the signed certificate to the MS application 27A, which in turn passes the signed certificate to PC utilization application 1C. The application 1C next passes the signed certificate to the standard authentication functionality in the PC browser 1A, which then completes the signature transaction with the web service.

It should be apparent that while a number of embodiments of these teachings have been disclosed, these teachings are not to be construed as being limited to only these embodiments. For example, the user could be prompted to enter a PIN into the PC 1, which then sends the PIN to the mobile station 10 for verification and further processing.

Thus, while the invention has been particularly shown and described with respect to preferred embodiments thereof, it will be understood by those skilled in the art that changes in form and details may be made therein without departing from the scope and spirit of the invention.

What is claimed is:

1. A method for conducting communication with a site reachable through the Internet, comprising:
   providing a mobile station;
   coupling a browser running on a computer to the site through the Internet;
   automatically detecting a presence of a received request from the site;
   in response to automatically detecting the presence of the received request, sending an inquiry to the mobile station from the computer for a list of certificates that are applicable to the request, the certificates being accessible by the mobile station;
   presenting the list of applicable certificates to the user for selecting one of the presented certificates;
   using the mobile station to communicate with a source of the selected certificate for completing the certificate;
   passing the completed certificate to the browser; and
   responsive to a receipt of the completed certificate, responding to the request received from the site.

2. A method as in claim 1, where the request comprises a request for an authenticated certificate, where the applicable certificates comprise authentication certificates, and where the completed certificate comprises an authenticated certificate.

3. A method as in claim 1, where the request comprises a request for a digital signature, where the applicable certificates comprise signature certificates, and where the completed certificate comprises a signed signature certificate.

4. A method as in claim 1, where the received request is detected based on message parsing.

5. A method as in claim 1, where message parsing comprises Multi-Purpose Internet Mail Extensions (MIME) field recognition.

6. A method as in claim 1, where completing the certificate comprises prompting the user to enter personal identification information using one of a computer user interface or a mobile station user interface, and verifying the entered personal identification information in cooperation with the source of the selected certificate.

7. A method as in claim 1, where the list of applicable certificates are displayed to the user using one of a computer user interface or a mobile station user interface.

8. A mobile station for conducting communication with a server reachable through a data communications network, comprising:
   a bidirectional data path for coupling to a network access application; and
   a controller, responsive to an automatic detection of a presence of a received request from the server by the access application or an extension of the access application, and to a reception of an inquiry from the access application, or the extension of the access application, for a list of mobile station accessible certificates that are applicable to the request, for returning the list of applicable certificates, and in response to the user selecting one of the certificates, for communicating with a source of the selected certificate for completing the certificate and passing the completed certificate to the network access application for responding to the request received from the server.

9. A method for conducting communication with a server, comprising:
   coupling an access application running on a computer to the server through a data communications network;
   automatically detecting a presence of a request that is received from the server, the request being one that requires an authentication of a user;
   in response to automatically detecting the presence of the request, sending a message from the computer to a mobile station over a link; the message comprising an inquiry for a list of certificates that are application to the request, the certificates being accessible by the mobile station;
   presenting the list of applicable certificates to the user for selecting one of the presented certificates;
   using the mobile station to communicate with a source of the selected certificate for completing the certificate which comprises a user authentication message;
   passing the completed certificate over a link to the access application running on the computer;
   responsive to a receipt of the completed certificate, sending user authentication information to the server using the access application.

* * * * *